Feb. 22, 1927.　　　　　E. C. HEAD　　　　　1,618,956
METHOD OF HOBBING GEARS
Filed Jan. 23, 1922　　　3 Sheets-Sheet 1
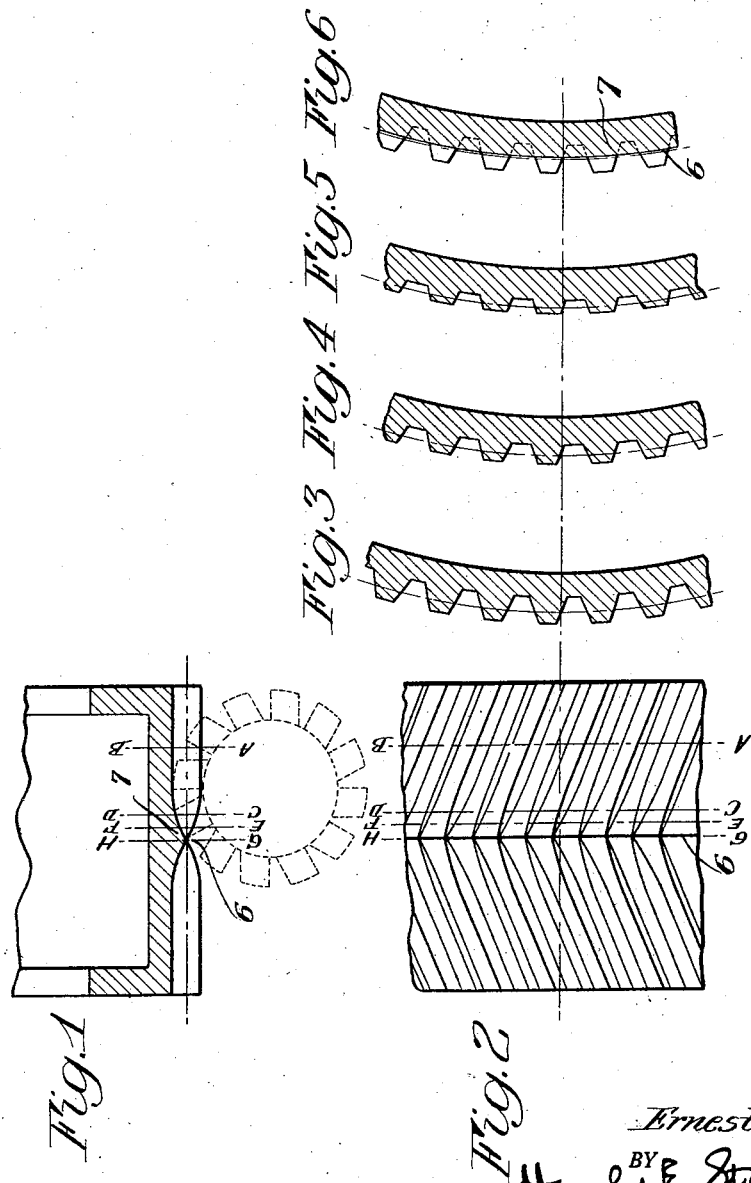
INVENTOR.
Ernest C. Head
BY Harold E. Stonebraker
his ATTORNEY Feb. 22, 1927.

E. C. HEAD 1,618,956

METHOD OF HOBBING GEARS

Filed Jan. 23, 1922  3 Sheets-Sheet 2

INVENTOR.
Ernest C. Head
Harold E. Stonebraker
his ATTORNEY

Feb. 22, 1927.
E. C. HEAD
1,618,956
METHOD OF HOBBING GEARS
Filed Jan. 23, 1922    3 Sheets-Sheet 3
Fig.10
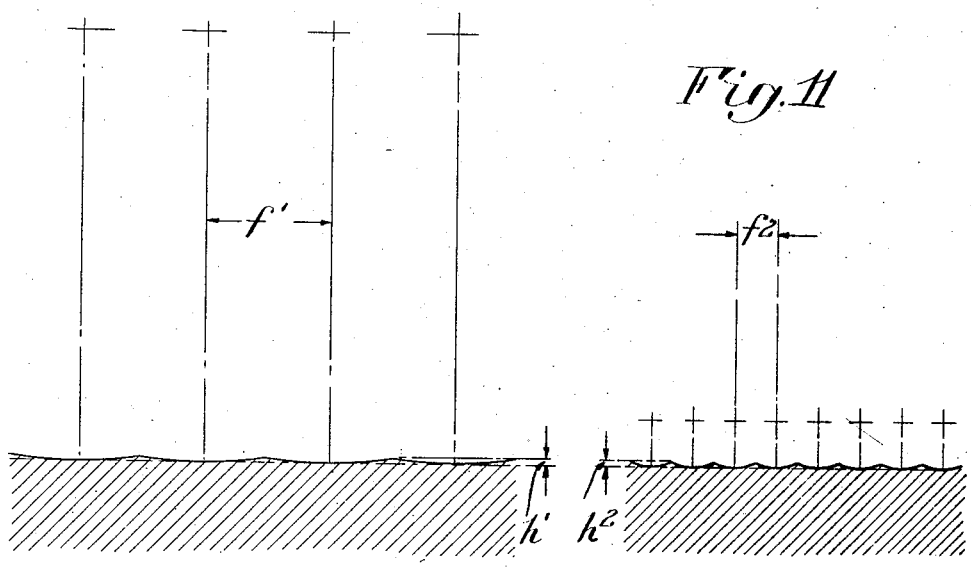
Fig.11
Fig.12
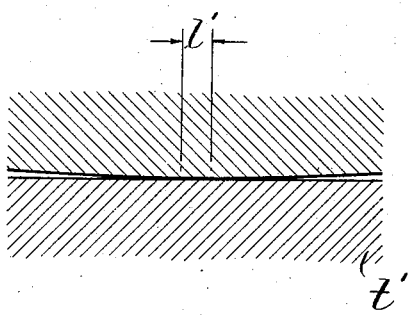
Fig.13
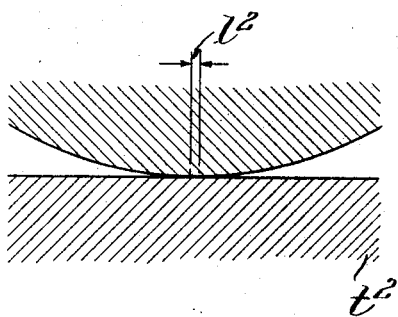
INVENTOR.
Ernest C. Head
BY Harold E. Stonebraker
*his* ATTORNEY Patented Feb. 22, 1927.

1,618,956

UNITED STATES PATENT OFFICE.

ERNEST C. HEAD, OF ROCHESTER, NEW YORK, ASSIGNOR TO GLEASON WORKS, OF ROCHESTER, NEW YORK, A CORPORATION OF NEW YORK.

METHOD OF HOBBING GEARS.

Application filed January 23, 1922. Serial No. 531,106.

The invention relates to a method of hobbing gears, and has for its principal purpose to provide a practicable and economical way for large quantity production of gears, and having teeth that are either curved or straight lengthwise.

A further object of the invention is to produce gears with a hob having a zero or substantially zero pressure angle on its generating edge, insuring uniform curvature and thickness of a tooth throughout its length and good bearing or contact between teeth of intermeshing gears.

While applicable generally to the production of spur and bevel gears, the invention has for a particular purpose the production of a herringbone gear in which the teeth extend from opposite edges of the gear face to the center thereof, and are constructed so as to afford proper contact between the teeth of intermeshing gears entirely across the faces of the gears.

An additional object of the invention is to produce a herringbone gear by means of a hob which cuts from opposite edges to the center of the gear face, producing a tooth with a body portion of uniform depth, and an end portion at the center of gradually decreasing depth, the tooth being characterized by uniform curvature and uniform thickness throughout the body and end portions referred to.

With these and other ends in view, the invention includes the structure and operation that will appear fully from the following description, in conjunction with the accompanying drawings, the novel features being pointed out in the claims following the description.

In the drawings:

Figure 1 is a sectional view of a herringbone gear showing, in dotted lines, the position of the hobs when making the finishing cuts;

Figure 2 is a plan view of the gear appearing in Figure 1;

Figures 3, 4, 5 and 6 are sectional views on lines A—B, C—D, E—F and G—H respectively of Figures 1 and 2;

Figure 10 is an enlarged diagrammatic sectional view showing the relation of a generating edge to the side of a tooth in successive traversing or feeding positions of the hob across the face of a blank;

Figure 11 is a similar view of the usual type of hob as heretofore constructed;

Figure 12 is an enlarged diagrammatic sectional view showing the path of travel of a generating edge with reference to the side of a gear tooth for one position of the hob, and Figure 13 is a similar view of the usual type of hob as heretofore constructed.

The gear produced by the hobbing operation herein disclosed forms the subject matter of co-pending application Serial No. 531,105, filed January 23, 1922, while the process, in its broadest aspect, is embodied in co-pending application Serial No. 531,107, filed January 23, 1922, and this application is intended to cover the method and mechanism by which the gear or pinion is produced by a hobbing operation.

Figure 9:
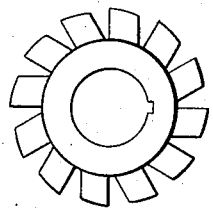
Figure 9 is an end view of the hob.
Figure 8:
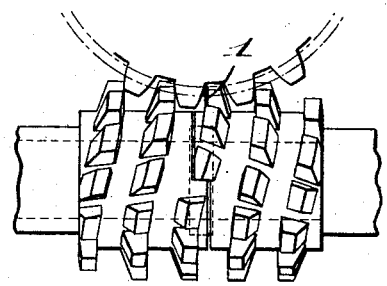
Figure 8 is a similar view illustrating the hob in elevation, and arranged for cutting a pinion.
Figure 7:
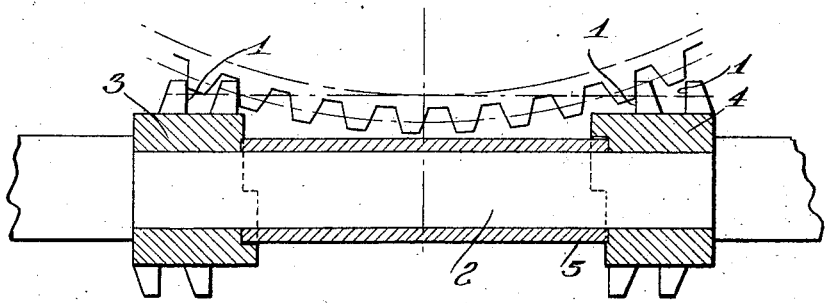
Figure 7 is a longitudinal sectional view of a hob such as employed in producing a gear embodying the invention, and showing a portion of the gear in side elevation.

The present process consists in general in utilizing a hob with its cutting elements arranged to operate on one side of a tooth only at a time, the cutting edges of the hob, designated at 1, being disposed perpendicularly or substantially perpendicularly to the rotary axis 2 of the hob. The hob which in the embodiment illustrated is cylindrical is also preferably made in two sections 3 and 4, adapted to be spaced apart by a sleeve 5 when cutting a large gear, as illustrated in Figure 7, and to be brought close together for cutting a pinion, as illustrated in Figure 8, in order that the hob may cut slightly beneath a tangent to the base circle or base line of the gear.

The hob sections need not necessarily be arranged on the same spindle, since other practical and successful arrangements are possible for carrying out the underlying idea of a pair of hobs or hob sections positioned in cutting relation to a blank on the same side of a plane containing the blank axis. The two hobs or hob sections are offset endwise of their respective axes from a line normal to the hob axes and passing through the center of the blank, the distance through which each hob is thus offset being fixed during the cutting operation and predetermined in accordance with the size of the blank.

By arranging the generating edges of the hob perpendicular or substantially perpendicular to the hob axis, it is possible to secure considerably faster production. This is illustrated in Figures 10 to 13, which show a comparison of the present hob with the usual type of hob as previously constructed, both as to successive feeding positions of the hob across the blank and as to the length of contact between a generating edge and the tooth face being generated.

By using a generating edge that is perpendicular or substantially perpendicular to the rotary axis of the hob, a longer or more sweeping cut with reference to the side of the tooth is obtained, as indicated in Figure 10, which shows successive cutting positions of the hob as it is fed across the face of the blank. In prior types of hobs, with the generating edge disposed at a considerable angle to a perpendicular to the hob axis, a short arc of movement of the generating edge with reference to the side of the tooth is obtained, as in Figure 11, and consequently a slower feed of the hob is necessary than with the present hob illustrated by Figure 10. The distance between successive feeding positions of the hob are indicated at $f'$, $f^2$, while $h'$, $h^2$ indicate the heights of the uncut portions between successive feeding positions.

When disposed perpendicularly or substantially perpendicularly to the hob axis, the generating edge is in contact with the side of the tooth for a longer distance, shown at $l'$ in Figure 12, than with the old type of hob as illustrated at $l^2$ in Figure 13. The theoretical arrangement for maximum speed of feeding the hob is with the generating edge exactly perpendicular to the hob axis, but in practice, it is sometimes desirable to incline the generating edge slightly with reference to the hob axis in order to afford a better tooth bearing, prevent interference with the tooth of the blank, and obtain the necessary cutting clearance.

Such inclination of the generating edge with reference to the hob axis is preferably no more than enough to obtain the clearance referred to, and permit practical cutting. Any such slight variation of the generating edge from a perpendicular relationship to the hob axis is not enough to diminish substantially the intimate contact desirable between the tooth surface being generated and the theoretical helical surface formed by successive generating edges of the hob, and it is this relationship between the generating edges of the hob and the tooth surface that makes possible the feeding speed referred to, and which constitutes an important characteristic of my method.

Another advantage in my invention lies in the use of two hobs, one of which generates on one side of the teeth while the other generates on the opposite side of the teeth, which enables cutting gears of any size or any number of teeth, and also materially increases the cutting speed with hobs having generating edges characterized by a substantially zero pressure angle, and by varying the relationship betwen the two hobs, the thickness of the teeth on the blank can be modified.

While I have described the method with reference more particularly to herringbone gears, and including a particular setting of the hob, it will be understood that this invention is capable of further modification without departing from its intent or the scope of the following claims, and this application is intended to cover any adaptations, uses, or embodiments following in general, the principles of the invention and including such departures from the present disclosure as come within known or customary practice in cutting gears, and may be applied to the essential features hereinbefore set forth.

Referring to Figure 1, the hob is caused to traverse the gear face by any suitable mechanism, as usual in this type of machine, both the hob and blank being in rotative engagement until the final cut of the hob is at the center of the gear face, and thus the final cutting action is in a circular path passing from the bottom of the tooth space outwardly through the center point of the gear face. This results in a tooth of decreasing depth, or a decreasing end portion at the center, and it is important to preserve proper contact between the teeth entirely to the center of the gear face and throughout the end portion of the tooth where its depth decreases, as otherwise the efficiency of the gear would be lessened in proportion to the decrease in the effective length of tooth.

Such proper contact is obtained by having the cutting edges of the hob disposed perpendicularly or substantially perpendicularly to the axis about which the hob rotates, and the curve in the profile of the tooth will thereby remain the same at the deepest portion of the tooth and throughout its end portion of decreasing depth. This is illustrated in Figures 3 to 6, where it will be observed that the profile of the tooth remains the same for any cross section, and the effect at the reduced end portion of the tooth is as though portions of the top and bottom of the main or body portion of the tooth were cut away, without changing the profile of the remaining or uncut part. Thus, the thickness of the tooth remains uniform throughout its entire length, measured at any point on the pitch line or any line parallel thereto. In order to afford properly mating teeth between intermeshing gears, the tooth face is cut away in any suitable way at 6, an amount corresponding in size and form to the enlarged portion 7 formed at the center of opposite tooth spaces.

I claim:

1. The method of hobbing a herringbone gear which consists in employing a hob in which the cutting surfaces are perpendicular to the rotary axis of the hob and in causing said hob to traverse the gear face until it has cut to the center of the gear face.

2. The method of hobbing a herringbone gear consisting in forming a tooth with a body portion of uniform depth and an end portion of gradually decreasing depth located adjacent to the center of the gear face, by utilizing a hob in which the cutting surfaces are arranged perpendicularly to the rotary axis of the hob.

3. The method of hobbing a herringbone gear which consists in employing a hob with cutting surfaces arranged perpendicularly to the rotary axis of the hob, setting the hob so that the bottom points of the cutting edges extend slightly beneath a tangent to the base circle of the gear, and traversing the hob across the blank until it cuts to the center of the gear face.

4. The method of hobbing a herringbone gear so as to form the teeth with body portions of uniform depth and with end portions of gradually decreasing depth located adjacent to the center of the gear face, which consists in forming one part of the teeth by traversing a tool, having its cutting portions arranged in a continuous thread from one side of the gear face to the center thereof and forming the other part of the teeth by traversing a tool, having its cutting portions arranged in a continuous thread from the opposite side of the gear face to the center thereof.

5. The method of producing a gear which consists in employing a hob, having a plurality of cutting teeth arranged in a thread and each provided with generating side cutting edges, the outer portions of which are straight and substantially perpendicular to the rotary axis of the hob, mounting said hob in cutting relation with a gear blank so that said outer portions lie between a tangent to the base circle and the center of the gear blank and rotating said hob in continuous cutting relation with the blank while simultaneously rotating the blank on its axis.

6. The method of cutting a gear which consists in rotating a hob having a plurality of cutting teeth arranged in a thread and provided with generating side cutting edges that are straight from end to end in continuous cutting relation with a rotating blank while maintaining the generating edges of the hob substantially perpendicular to its rotary axis.

7. The method of producing a gear which consists in employing a hob having a plurality of cutting teeth arranged in a thread and each provided with generating side cutting edges, the outer portions of which are straight and substantially perpendicular to the rotary axis of the hob, mounting said hob in cutting relation with a gear blank so that it is offset axially with reference to a line passing through the center of the blank normal to the hob axis and so that said outer portions lie between a tangent to the base circle and the center of the gear blank, and rotating said hob in continuous cutting relation with the blank while simultaneously rotating the blank on its axis.

8. The method of cutting a gear which consists in mounting a pair of hobs, each having a plurality of cutting teeth arranged in a thread and provided with generating side cutting edges that are straight from end to end in cutting relation at different points of a gear blank on the same side of a plane containing the blank axis, rotating the hobs in continuous cutting relation with a rotating blank while maintaining the generating edges of each hob substantially perpendicular to its rotary axis, and generating one side of a tooth of the blank with one hob and the opposite side of a tooth with the other hob.

9. The method of cutting a gear which consists in mounting a pair of hobs, each of which has a series of cutting teeth arranged in a thread and provided with generating side cutting edges that are straight from end to end and substantially perpendicular to the rotary axis of the hob, in cutting relation with a gear blank so that the outer portions of the generating edges of each hob, when in cutting position, lie between a tangent to the base circle and the center of the gear blank and so that the hobs are offset in opposite directions at fixed distances in the direction of their axes from a line passing through the center of the gear blank normal to the hob axes, and rotating the hobs and blank in continuous cutting relation to generate one side of the teeth of the blank with one hob and the other side of the teeth with the other hob.

10. The method of cutting a gear which consists in selecting a hob, having a plurality of cutting teeth arranged in a thread and provided with generating side cutting edges, and offsetting said hob axially a fixed distance with reference to a line passing through the center of the gear blank normal to the hob axis, and rotating the hob in continuous cutting relation with a rotating blank while maintaining the generating edges of the hob substantially perpendicular to its rotary axis.

11. The method of cutting a gear which consists in mounting a pair of hobs, each of which has a plurality of cutting teeth arranged in a thread, so that the hobs are offset axially in opposite directions at fixed distances from a line passing through the center of the gear blank normal to the hob axes, and rotating the hobs in continuous cutting relation with the blank while simultaneously rotating the blank, one hob generating one side of a tooth of the blank and the other hob the opposite side of a tooth of the blank.

12. The method of cutting a gear which consists in employing a hob having a plurality of cutting teeth arranged in a thread and each provided with generating side cutting edges, which are straight from end to end and substantially perpendicular to the rotary axis of the hob, mounting said hob in cutting relation with a gear blank so that it is offset axially with reference to a line passing through the center of the blank normal to the hob axis and so that the outer portions of the generating edges lie between a tangent to the base circle and the center of the gear blank, and rotating said hob in continuous cutting relation with the blank while simultaneously rotating the blank on its axis.

13. The method of cutting a gear which consists in selecting a cylindrical hob having a plurality of cutting teeth arranged in a thread and provided with generating side cutting edges and rotating said hob in continuous cutting relation with a rotating blank while maintaining the generating edges of the hob straight from end to end and substantially perpendicular to a longitudinal element of the cylinder.

14. The method of cutting a gear which consists in mounting a pair of cylindrical hobs, each of which has a plurality of cutting teeth arranged in a thread and provided with generating side cutting edges that are straight from end to end, so that the hobs are offset axially in opposite directions at fixed distances from a line passing through the center of the gear blank normal to the hob axes and so that the outer portions of the generating edges of each hob lie between a tangent to the base circle and the center of the gear blank, and rotating the hobs in continuous cutting relation with the blank while simultaneously rotating the blank on its axis, one hob generating one side of the teeth of the blank and the other hob the opposite side of the teeth of the blank.

In witness whereof, I have hereunto signed my name.

ERNEST C. HEAD.